United States Patent [19]
Fritz

[11] 4,400,042
[45] Aug. 23, 1983

[54] HIGH PERFORMANCE LOW TORQUE ANTI-FRICTION BEARING ASSEMBLY

[75] Inventor: Conrad M. Fritz, Altadena, Calif.

[73] Assignee: Keystone Engineering Company, Los Angeles, Calif.

[21] Appl. No.: 337,598

[22] Filed: Jan. 7, 1982

Related U.S. Application Data

[63] Continuation of Ser. No. 196,753, Oct. 14, 1980, abandoned.

[51] Int. Cl.³ ............................................. F16C 19/10
[52] U.S. Cl. ..................................... 308/227; 308/230
[58] Field of Search ............... 308/227, 230, 233, 174, 308/221, 225, 229

[56] References Cited

U.S. PATENT DOCUMENTS

| | | | |
|---|---|---|---|
| 3,002,429 | 10/1961 | Franke et al. | 308/230 |
| 3,030,158 | 4/1962 | Pöhler | 308/230 |
| 3,361,500 | 1/1968 | Pöhler | 308/227 |
| 4,030,786 | 6/1977 | Schluter et al. | 308/227 |

Primary Examiner—Lenard A. Footland
Attorney, Agent, or Firm—Sellers and Brace

[57] ABSTRACT

A high performance anti-friction bearing assembly for use in supporting a low torque stabilized platform as, for example, a gun platform mounted on aircraft, a ship or a land vehicle. The bearing assembly comprises three rings of forged alloy steel separated by two axially spaced rings of balls along elements of converging conical surfaces. The balls and their cooperating raceways have a conformity factor of approximately 0.59 and are pre-loaded against these raceways at a normally prevailing contact angle of 35°. The high conformity factor together with various other design features provide a bearing for a stabilized platform operating at high efficiency with minimal torque losses under both simultaneous and non-simultaneous axial, radial and moment load conditions and associated distortio

26 Claims, 6 Drawing Figures

HIGH PERFORMANCE LOW TORQUE ANTI-FRICTION BEARING ASSEMBLY

This application is a continuation of my application for U.S. Ser. No. 196,753 filed Oct. 14, 1980, abandoned.

This invention relates to anti-friction bearings and more particularly to a simple low-cost, heavy duty, two row, anti-friction bearing assembly, exhibiting minimal torque losses under severe operating conditions.

BACKGROUND OF THE INVENTION

Stabilized platforms for guns whether mounted on aircraft, shipboard, or land vehicles, subject the bearing interconnecting the rotating and non-rotating components of the platform to extremely severe operating conditions. This bearing typically supports many tons and must exhibit minimal torque losses and variations in torque necessary for stabilization performance under simultaneously occurring axial, radial and moment load conditions.

Anti-friction bearings equipped with double wire raceways have been proposed heretofore in efforts to meet these operating requirements but are complex, costly and difficult to manufacture. Representative bearings of this type are disclosed in the following U.S. Pat. Nos.: Pohler 3,030,158; Pohler 3,361,500; Schluter 3,482,892; Longren et al 3,517,975; Schluter 3,802,755; Schluter 4,030,786; and Bottner et al 4,126,361.

SUMMARY OF THE INVENTION

This invention provides a light weight, high performance, anti-friction bearing employing two rows of balls held captive under pre-load between three forged alloy steel rings. One of these rings is aptly called a nose ring because having a radial annular flange provided on its lateral faces with oppositely facing arcuate raceways. The other two rings are equipped with arcuate raceways diagonally opposed to a respective one of the nose ring raceways. A separate row of balls is mounted between each of these two pairs of raceways each having a normal contact angle of 35° with respect to a plane normal to the axis of each row. Each raceway extends through an arc of substantially 90° and has a radius only slightly greater than the ball radius. The ratio of this race radius and the ball diameter is commonly known as the conformity ratio or constant and the value found to exhibit highly superior performance characteristics under both simultaneous and non-simultaneously occurring axial, radial and moment load conditions characterizing the present invention is about 0.59 or very substantially higher than in conventional use. The use of this conformity factor substantially reduces torque losses with only a readily tolerated reduction in load capacity easily compensated for by the designer.

A particular salient feature of this invention is that, under preload, the net torque changes are not only minimal but restricted to a narrow range even under severe loading conditions such as those due to gun recoil or shock, or caused by abrupt pitching in rough seas or in travelling over shell-pocked or rough terrain. Under such conditions the contact angles between axially related pairs of balls in the two rows change in opposite directions relative to one another and relative to the diametrically related balls on the other side of the bearing assembly, whereby the associated changes in torque losses due to load in combination with distortions substantially nullify one another. This nullification or compensation of paired and opposed changes in torque takes place with respect to all axially related balls in each axial diametric plane.

Another important feature of the invention is the provision of short lengths of cage ring segments formed of semi-flexible plastic material each provided with a plurality of openings each loosely accommodating a single ball. The two end openings are elongated circles, with the minor axis extending crosswise of the segments and having a length only slightly greater than the diameter of the balls. The major axes of these openings correspond generally with the diameter of the intervening openings. It will therefore be apparent that the cage segments are supported by the two end balls in a common plane and that the remaining periphery of all openings have minimal contact with the balls.

A further feature of the invention is the fact that the nose of the nose ring is positioned generally radially opposite and spaced from an axial flange of one of the two other bearing rings. This axial flange serves the dual purpose of precisely positioning these two rings relative to one another and additionally holding the second row of balls and cage segments in place during assembly and disassembly of the bearings.

These and other more specific objects will appear upon reading the following specification and claims and upon considering in connection therewith the attached drawing to which they relate.

Referring now to the drawing in which a preferred embodiment of the invention is illustrated:

Figure 1:
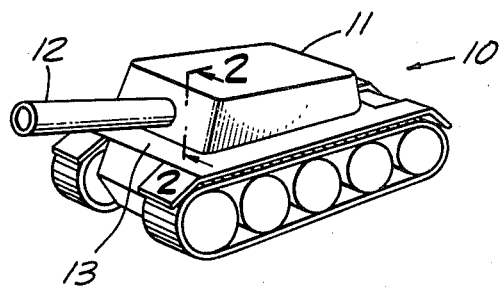
FIG. 1 is a perspective view of a land vehicle equipped with a stabilized gun supporting platform and interconnected by an illustrative embodiment of the invention two row ball bearing assembly.

Referring initially to FIG. 1, there is shown a military tank equipped with a stabilized platform in the form of a turret 11 supporting an anti-aircraft or the like guns 12. Although not shown, it will be understood that gun 12 includes means enabling it to be elevated through a vertical arc and that it is rotatable along with turret 11 through 360° about the vertical axis of the turret. This stabilized platform or turret is joined to the armoured hull 13 of tank 10 by the novel anti-friction bearing assembly of this invention shown in FIG. 2 and designated generally 20.

Bearing assembly 20 has a main body formed of three forged steel alloy rings comprising a nose ring 21 and a pair of cup forming rings 22, 23. Typically nose ring 21 underlies and is secured to turret 11 by cap screws, not shown, extending into the threaded bores 24. The two cup rings 22, 23 are clamped together by a plurality of cap screws 25 and lower cup ring 23 is secured to hull 13 in any suitable manner by fastener facilities bearing on the upper cup ring 22 at counter-sunk bores 26 well known in this art.

Nose ring 21 is so designated because its periphery is provided with an annular radial flange 27 formed on its opposite lateral faces with flame hardened arcuate raceways 28, 29. The diametrically opposed portions of rings 22 and 23 are deeply recessed and formed with flame hardened arcuate raceways 30 and 31 facing toward a respective one of raceways 28 and 29 of nose ring 21. The innermost edges of raceways 30 and 31 extend toward one another and are maintained in precise axial alignment by an axial flange 33 which mates with an annular recess 34 in ring 23. The contacting surfaces of flange 33 and recess 34 are accurately finished to assure the high precision concentricity of the two pairs of raceways of rings 21, 22 and 23. The accurate spacing of the raceway pairs 28, 30 and 29, 31 from one another is assured where necessary by the use of appropriate shims 32. It will now be apparent that raceways 30 and 31 form an annular cup-shaped channel the bottom of which is radially opposite the nose or annular flange of nose ring 21. Shims 32 are used to adjust the necessary preload on the balls.

Figure 2:
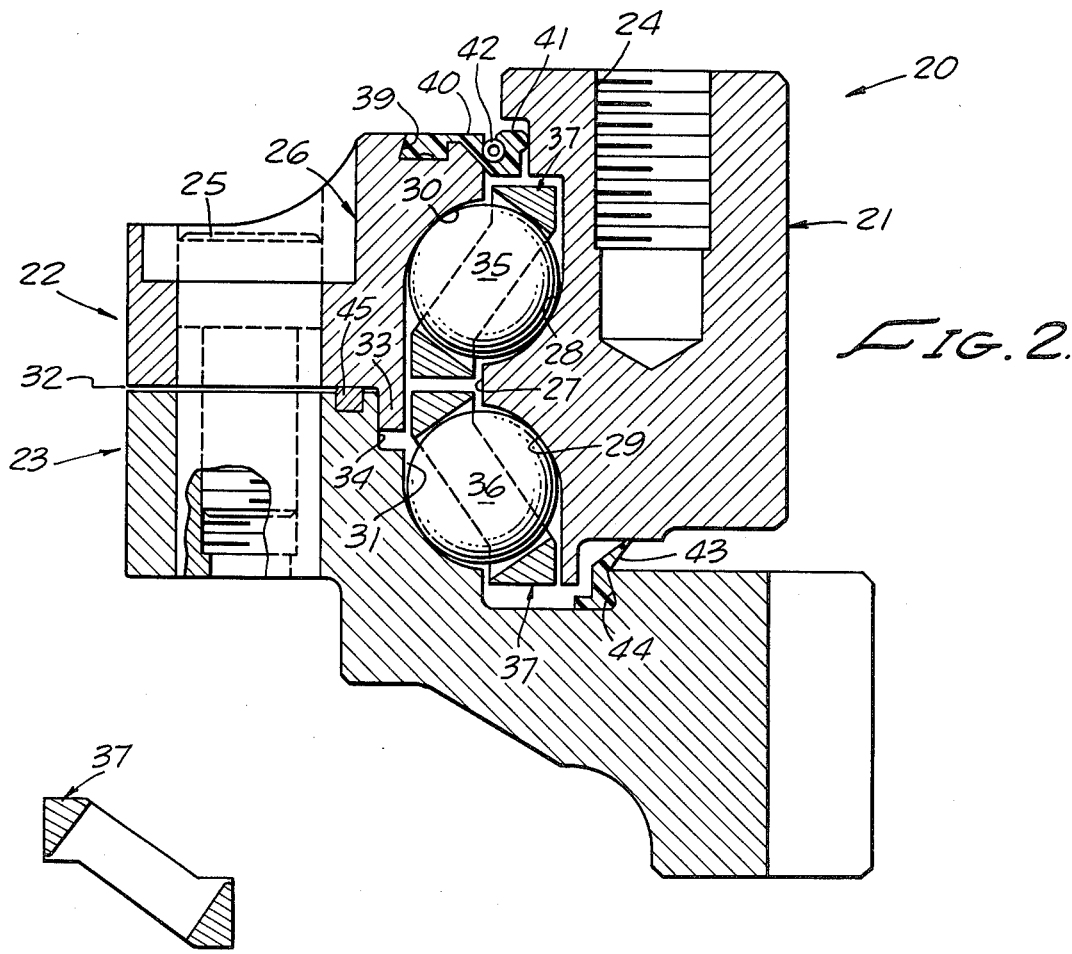
FIG. 2 is a cross sectional view through one side of the anti-friction bearing taken along line 2—2 on FIG. 1.
Figure 4:
FIG. 4 is a cross sectional view taken along line 4—4 on FIG. 3.
Figure 3:
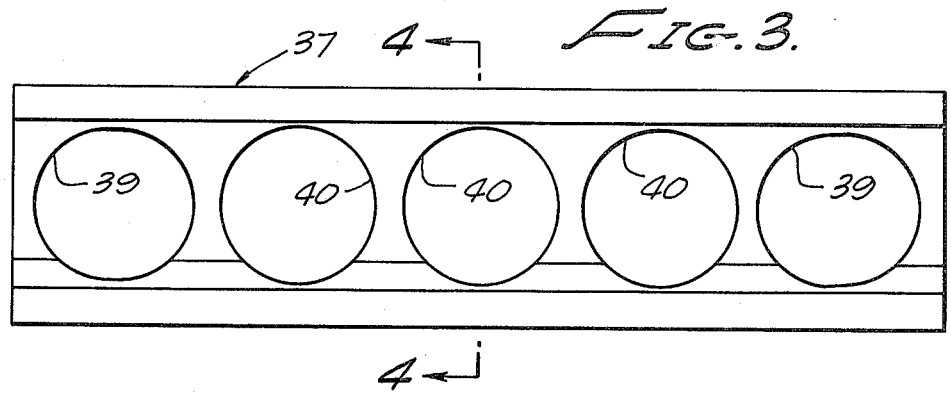
FIG. 3 is a side elevational view of one of the cage ring segments.

The rows of balls 35, 36 are retained captively assembled between the pairs of raceways 28, 30 and 29, 31 as is in FIG. 2 and are held closely spaced from one another by a multiplicity of metallic or non-metallic cage ring segments 37. These segments for each row of balls have a combined length substantially less than the circumference of a circle passing through the centers of each row of balls so that each segment can move along the raceway a short distance independently of adjacent segments. Segments 37 are preferably molded from semi-resilient plastic such as Delrin, Nylon, or the like, and are suitably contoured for assembly canted at an angle of about 35° to the axle of the bearing assembly approximately at 90° to the nominal contact angle. Each is provided with openings 39, 40 supporting a suitable number of balls 35, 36. The two end openings 39 are preferably elongated with the minor axis extending transversely of the segments and only slightly longer than the diameter of the balls mounted therein. The major axis is somewhat longer with the opposite ends having a radius slightly greater than the ball radius or otherwise so designed that the ball has only a single point of contact therewith. It will be recognised that this configuration and sizing of openings 39, 40 enables the balls in the two end openings 39 to cooperate in supporting the cage segments for the two rows of balls in separate frusto-conical rings with all segments lying in a common plane. As will be recognized, the larger diameter portions of openings 39 and the entire periphery of openings 40 have only incidental point contact with the balls moving at equal speeds located therein and therefore produce no or negligible friction losses. For example, the upper edge of openings 39 would normally have point contact with the ball located therein. Alternatively, one end of opening 39 could have point contact with the ball therein at times if the segment and the balls therein are in motion at differential rates such that the cage segment closes the gap normally existing between adjacent cage segments. Under typical operating conditions, such contact of cage segments seldom takes place due to the infrequency of simultaneously occuring severe moment loads and large arc rotary travel of the turret or other load supported by the bearing assembly. When two adjacent segments forcibly contact one another the segments are not deflected out of their common plane because any deflection tendency is counteracted by the minor axes of the adjacent openings 39 in the segments in contact.

The cage segments 37 for the two rows of balls 35 and 36 diverge inwardly toward the bearing axis from an area radially opposite nose 27 of ring 21. An important assembly consideration is predicted on this design feature, it being noted from FIG. 2 that the adjacent lateral edges of the two rows of cage segments are disposed between the axial flange 33 of cup ring 22 and the periphery of flange 27 of nose ring 21. This greatly facilitates assembly and disassembly of the bearing for reasons which will be pointed out when describing the assembly operation.

The annular cavities occupied by the balls 35 and 36 are provided with seals to retain lubricant and to prevent the entry of foreign matter. For this purpose, cup ring 22 is provided with a dovetail channel 39 captively seating a resilient radial seal 40 having a lip 41 pressed against the periphery of nose ring 21 by a garter spring 42. A resilient face seal 43 socketed in a groove 44 of cup ring 23 seats against the lower end face of nose ring 21. The adjacent radial surfaces of cup rings 22, 23 are sealed by a gasket ring 45.

Figure 5:
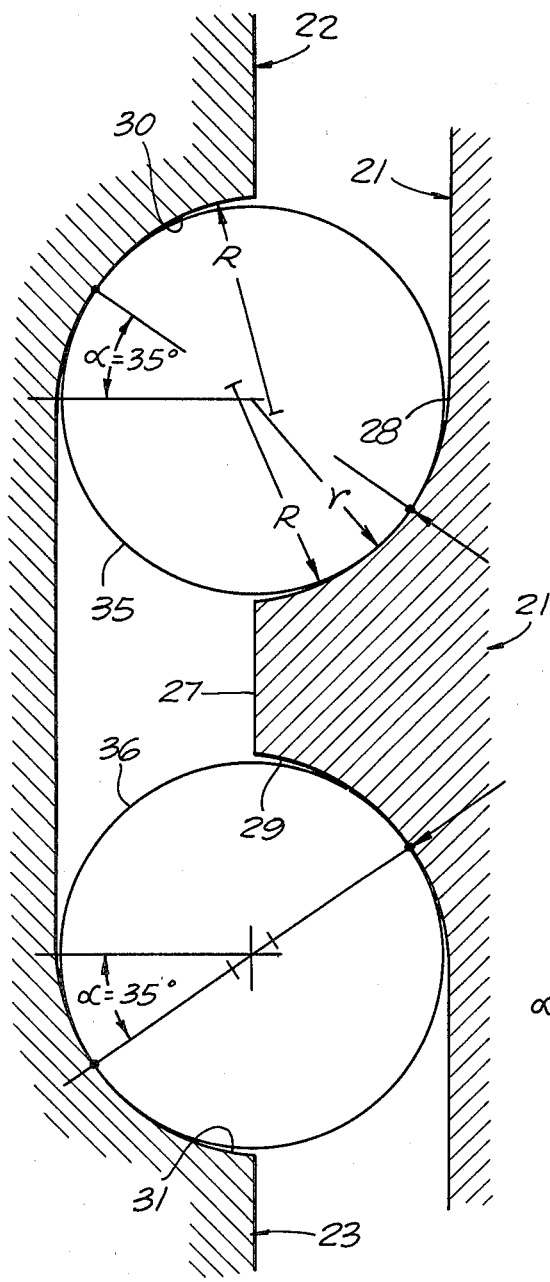
FIG. 5 is a cross sectional view on an enlarged scale of the bearing assembly under normal static loading conditions.
Figure 6:
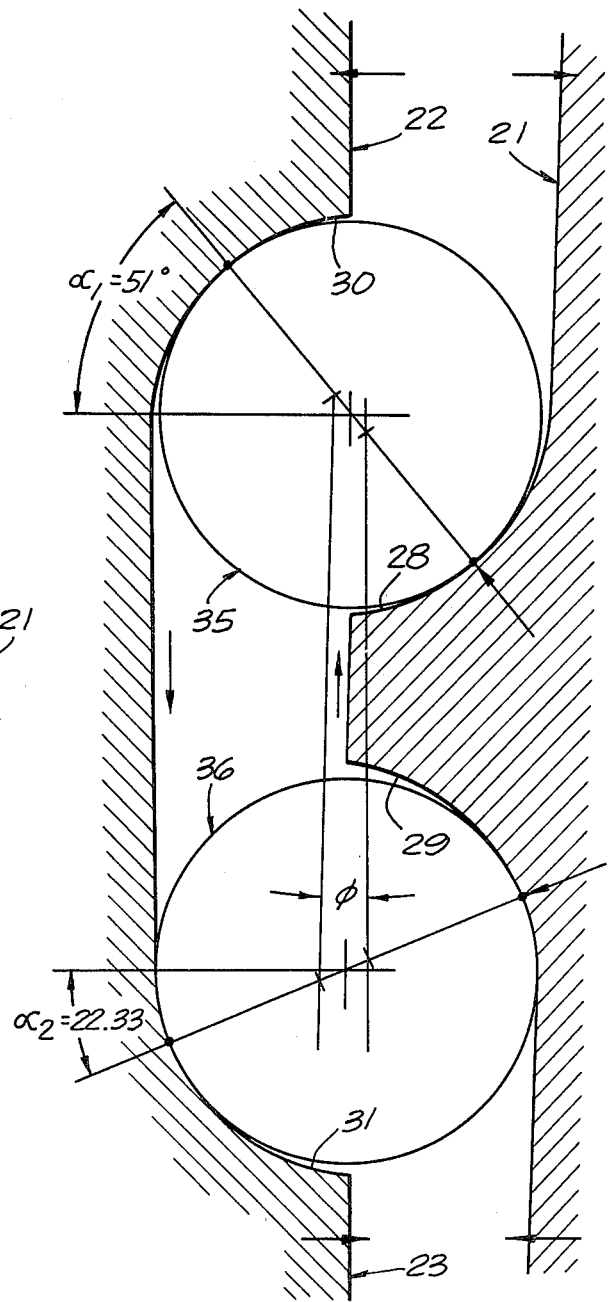
FIG. 6 is a view similar to FIG. 5 showing the bearing under severe clockwise moment loading conditions, of the nose ring or under local distortion of the vehicle structure.

Referring now to FIGS. 5 and 6, important geometric aspects of the bearing design will be described. FIG. 5 shows the two rows of balls 35 and 36 assembled under preloaded static conditions whereas FIG. 6 is a similar showing under clockwise moment loading conditions wherein the inner bearing ring 21 is tilted upwardly and to the right relative to the cup rings 22 and 23.

The radius R of raceway 28, 29, 30 and 31 is considerably greater than the radius r of balls 35 and 36. In consequence, the bearing assembly of this invention has a conformity constant which is substantially larger than the conformity constant 0.52 conventionally employed in ball bearing assemblies. The conformity constant (f) is the ratio of the raceway radius and the ball diameter and is represented by the following equation:

$$f=(R/D)=(R/2r)$$

A bearing assembly incorporating the principles of this invention and providing excellent operating results satisfying the exacting requirements of a gun-mounting stabilized platform has a conformity factor of about 0.59.

The contact angle alpha between a plane through the points of contact of each row of balls with their raceways and a diametric plane through the centers of all balls in a given row under static conditions is approximately 35°. However, under moment loading conditions the contact angle changes from this static condition but in such manner that the increase in torque or friction losses of half the balls in each row is substantially nullified or compensated for by a decrease in the torque or friction losses of the other half of the balls. For example, referring now to FIG. 6, it will be noted that under rather extreme moment loading in a clockwise direction, the inner or turret supporting bearing ring 21 tilts clockwise through the angle phi. This causes the contact angle alpha of the upper row of balls 35 to increase to a value such as 51° and the contact angle of the lower row of balls 36 to decrease to a value such as 22°. It will be readily recognised upon reflection that the diametrically related pair of balls 35, 36 on the opposite side of the bearing assembly will experience a similar but opposite nulllifying set to torque changes. In other words, the contact angle of a ball 36 on the opposite side of the bearing assembly will increase to approximately 51° whereas the contact angle of the overlying ball 35 will decrease to approximately 22°. Torque losses decrease as the contact angle increases and vice versa. Greater changes in torque loss occur in the plane of the moment loading and decrease to a minimum in an axial plane at right angles to the moment plane.

Other very important aspects of the invention bearing assembly involve important beneficial characteristics and the low torque losses achieved by using a conformity constant substantially higher than in conventional practice and preferably in the vicinity of 0.59. This high conformity constant reduces the interaction between the cage segments, and minimize variations in friction losses and the associated variations in the rate of movement of both the balls and the race segments caused primarily by more severe moment loading of the bearing. These factors will now be explained by reference to FIGS. 5 and 6.

As previously explained, the bearing assembly is preloaded during assembly. Under normal static loading conditions the points of contact of the two rows of balls 35 and 36 with the pairs of raceways 28, 30 and 29, 31 are located along converging conical elements lying at a contact angle alpha of 35° to an associated diametric plane normal to the bearing axis.

Assuming now that a tank vehicle having its turret connected to the tank hull by the invention bearing assembly is subjected to severe moment loading in a direction such that the nose ring 21 pivots in a clockwise direction relative to the cup ring 22. This operating condition is shown in FIG. 6 and it will be noted that the contact angle alpha 1 for balls 35 has increased to 51° whereas the contact angle alpha 2 for balls 36 has decreased to 22°. The severe forces to which the vehicle is subjected, acting in concert with the movement of the turret relative to the hull, results in distortion of the hull, the turret and each of the nose and cup rings of the bearing assembly. These transitory, temporary conditions disturb the planicity of one or both bearing rings in one or more regions about their peripheries so that the raceway surfaces become undulating and non-circular. These distortions and undulations of the turret hull and raceways, even though they may be small, adversely affect the movement of the balls and the associated cage segments 37. This will be readily apparent from a consideration of FIG. 6 from which it will be observed that the increase of the contact angle alpha from 35° to 51° reduces the radius of ball 35 relative to its points of contact with raceways 28 and 30. On the other hand the decrease of the contact angle from 35° to 22° for ball 36 increases the radius of ball 36 relative to raceways 29 and 31. In consequence, the travel speed of the balls and the cage segments differ in reverse fashion depending on which one of the rings is rotating faster. If the outer ring is rotating faster, the rate of ball propogation decreases as the contact angle increases; the reverse is true if the contact angle decreases. The reverse of the foregoing applies if the inner ring is rotating faster. It follows that the travel rates and distances of balls 35 and 36 and of their respective cage segments during one full revolution of the bearing ring are distinctly different. Moreover, these travel rates and distances differ in different portions of each row of balls. If any ball and/or cage segment is travelling at a different rate than other balls or cage segments, sliding necessarily occurs between contact areas with attendant frictional losses.

For these reasons, and in accordance with the principles of this invention, it is beneficial to provide each row of balls with a multiplicity of cage segments, each having a limited number of balls and normally having their adjacent ends spaced a short distance from one another. This permits the segments to move independently of adjacent segments thereby to minimize if not eliminate friction loss through interference of one segment with the movement of an adjacent one.

The spacing between the cage segments in each row at initial assembly might prove quite inadequate except for the fact that undulating portions of the raceways cause the balls to alternately slow down and to speed up and this change in travel rate is imparted to the cage segments. Moreover, this distortion and undulating condition may and usually does vary in degree along the path of ball travel. Accordingly, there exists along the race periphery a mixture of the geometry of FIGS. 5 and 6 with the condition in one figure blending into that represented in the other. For these reasons, some groups of balls together with the associated cage segments are increasing slightly in speed as others are receding from one another in the same row.

It follows from the foregoing analysis that the forced sliding of the balls and the additional friction losses resulting therefrom is minimized if not totally eliminated, a result achieved by adopting a conformity constant of approximately 0.59 for the raceways 28 to 31. A conformity constant of this magnitude very substantially reduces the contact angles below the angles corresponding to a conventional conformity constant of 0.52.

Another factor of importance achieved when using a conformity constant of approximately 0.59 is the fact that usually, but not necessarily, the load on an axially associated pair of balls 35 and 36 vary from one another in opposite directions in approximately equal values, the load on ball 35 increasing as that on ball 36 decreases, thereby maintaining the net friction torque variation substantially constant.

It is also to be understood that the travel speed of the balls differs in reverse fashion depending on which one of the bearing rings is rotating at a faster rate relative to the other. If the rate of relative rotation is higher for the outer ring, then the rate of ball propagation decreases as the contact angle increases; the reverse is true if the contact angle decreases. If the rate of relative rotation favors the inner ring then the ball propagation is the reverse of that stated above.

Assembly of the components of bearing assembly 20 is carried out by arranging a ring of cage elements 37 and balls 35 along the entire circumference of raceway 28 of nose ring 21. This operation may be aided by embracing nose flange 27 with a fixture ring sized so as to be spaced from nose 27 sufficiently to accommodate the lower lateral edges of cage segments 37.

Following the assembly of balls 35 and their cage segments, cup ring 22 is lowered over these components as the cylindrical fixture is withdrawn. At this time the seal ring 40 may be detached from groove 39 since it is sufficiently resilient for later assembly past the upper flange of the nose ring. Once rings 21 and 22 are in place about the upper row of balls 35, rings 21 and 22 may be inverted so that the nose ring raceway 29 faces upwardly. The lower row of balls 36 and their cage ring segments 37 are then assembled about raceway 29, the upwardly facing flange 33 of cup ring 22 then cooperating with nose 27 to hold the cage segments 37 and lower row of balls 36 at rest against raceway 29.

After all of balls 36 have been assembled in this manner, cup ring 23 is lowered into position as flange 33 and the sidewall of groove 34 cooperate in piloting ring 23 into their assembled positions. Cap screws 25 are then inserted to clamp the three rings 21, 22 and 23 firmly assembled and the balls 35, 36 preloaded. In this connection one or more shims 32 may be inserted between the rings 22 and 23 are necessary to preload the balls to a desired value.

Face seal 43 is normally assembled to groove 44 of ring 23 prior to the assembly of the latter to the other two rings. However, seal 40 is normally assembled at a later stage of the assembly operation, this seal being sufficiently resilient when garter spring 42 is detached for assembly about the overlying flange of ring 21. The mounting flange of seal 40 can be pressed into mounting grooves 39 after the garter spring 42 has been replaced.

While the particular high performance low torque anti-friction bearing assembly herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A heavy-duty anti-friction bearing assembly suitable for use in supporting a stabilized platform or the like with minimal torque losses under simultaneously-occurring axial, radial and moment loads, comprising:
   first, second and third annular forged alloy steel rings;
   said first ring having an annular radial flange provided with a pair of arcuate raceways located one on either side of said radial flange;
   said second and third rings including fastener means for clamping the same rigidly assembled axially of one another concentrically of said radial flange of said first ring, said second and third rings each having an arcuate raceway facing toward and spaced from a respective one of the arcuate raceways of said first ring;
   a separate ring of pre-loaded balls located between the raceways of said first and second rings and the adjacent raceway of said pair of raceways on said first ring;
   each of said raceways extending over an arc of substantially 90° and said balls and said raceways having a conformity constant of approximately 0.59; and
   each of said rings of balls including a plurality of elongated cage ring segments arranged in end-to-end spaced apart relation and each provided with a plurality of openings each loosely accommodating a single one of said balls, said cage segments for each ring of balls lying in oppositely converging conical surfaces.

2. A heavy duty bearing assembly as defined in claim 1 characterized in that the balls in each of said rings thereof are normally in contact with the associated pair of raceways at diametrically opposed points lying at a contact angle of approximately 35° to a plane common to the centers of all balls in a respective ring thereof.

3. A heavy duty bearing assembly as defined in claim 2 characterized in that when said bearing is subjected to severe moment loading and distortion of said bearing assembly said first annular ring tilts locally with its axis lying at a slight angle relative to the axes of said second and third annular rings and the contact angle of axially related balls in said two rings thereof shift in opposite directions and in a substantially self-compensating manner as respects torque losses.

4. A heavy duty bearing assembly as defined in claim 1 characterized in that said cage ring segments are formed of semi-flexible plastic material.

5. A heavy duty bearing assembly as defined in claim 4 characterized in that the openings at the opposite ends of said cage ring segments are non-circular and have a major axis disposed lengthwise of said segments and a minor axis disposed transversely of said segments and having a length slightly greater than the diameter of the ball mounted therein, and the remaining openings for said balls in said cage ring segments having a diameter corresponding generally to the length of the major axis of said elongated openings.

6. A heavy duty bearing assembly as defined in claim 1 characterized in that the outer diameter of said radial flange of said first annular ring is slightly less than the inner diameter of that one of said second and third rings past which said first ring must be axially shifted during assembly and disassembly operations.

7. A heavy-duty anti-friction bearing assembly suitable for use in supporting a stabilized platform or the like with minimal torque losses under simultaneously occurring axial, radial and moment loads capable of causing distortion of said bearing assembly comprising:
   a forged alloy steel nose ring having an annular radial nose, said nose ring being concentric to a pair of forged alloy steel cup-forming rings provided with a pair of arcuate raceways converging toward a respective arcuate raceway on the opposite sides of said radial nose of said nose ring;
   said pair of cup-forming rings having axially internesting flange and groove means between the raceways thereof and which axial flange is spaced generally radially opposite the nose of said nose ring;
   separate rows of balls mounted between an associated pair of raceways of said nose and cup-forming rings;
   a plurality of elongated cage ring segments for each of said rows of balls which segments are provided with a plurality of holes each loosely accommodating a single ball, said cage ring segments in the two annular rows thereof being canted away from one another with their adjacent lateral edges positioned radially between the radial nose of said nose ring and the axial flange means on a first one of said cup-forming rings and cooperating with one another to retain both of said rows of balls and cage ring segments in position during assembly and disassembly of the second one of said cup-forming rings.

8. An anti-friction bearing assembly as defined in claim 7 characterized in that said balls and said raceways have a conformity constant of about 0.59.

9. An anti-friction bearing assembly as defined in claim 7 characterized in that said cage ring segments have elongated openings at the opposite ends thereof which openings have a minor axis transversely of said segments which is slightly longer than the diameter of said balls and cooperating with a ball mounted therein to support said segments in a common plane normal to the axis of said bearing.

10. A heavy-duty anti-friction bearing assembly suitable for use in supporting a stabilized platform or the like with minimal torque losses under loads capable of causing distortion of said bearing assembly comprising:
  a forged alloy steel nose ring having an annular radial nose, said nose ring being concentric to a pair of forged alloy steel cup-forming rings provided with a pair of arcuate raceways converging toward a respective arcuate raceway on the opposite sides of said radial nose of said nose ring and each of which raceways have hardened surfaces;
  said pair of cup-forming rings having axially internesting flange and groove means between the raceways thereof;
  separate rows of balls mounted between an associated pair of raceways of said nose and cup-forming rings including means in each of said rows of balls for maintaining adjacent balls spaced apart; and
  each of said raceways extending over an arc of approximately 90° and said balls and said raceways having a conformity constant of approximately 0.59.

11. An anti-friction bearing assembly as defined in claim 10 characterized in that said two rows of balls are held assembled between said nose ring and said cup-forming rings under a predetermined preload.

12. An anti-friction bearing assembly as defined in claim 11 characterized in that the contact angle between each of said rows of balls and the associated pair of said raceways under static conditions is approximately 35°.

13. An anti-friction bearing assembly as defined in claim 11 characterized in that, under dynamic conditions, the contact angle between the balls in each row thereof and the associated pair of said raceways varies within a range of approximately 22° to 51° depending on operating conditions including simultaneously occurring axial, radial and moment loads acting to distort said bearing assembly.

14. A heavy-duty anti-friction bearing assembly suitable for use in supporting a stabilized platform with minimal torque losses under severe dynamic operating conditions comprising:
  three one-piece rings of homogenous material including a first ring having an annular radially disposed nose concentric to a pair of cup-forming second the third rings concentric to said first ring and provided with a pair of arcuate raceways converging toward a respective arcuate raceway on the opposite sides of the annular nose of said first ring;
  said second the third rings having interfitting means for maintaining the same against radial displacement relative to one another;
  separate rows of balls, including spacer means between adjacent balls in each row, mounted between a respective pair of raceways of said first and second rings;
  each of said raceways extending over an arc of approximately 90°; and
  the contact angle between the balls in each of said raceways under static conditions being approximately 35° to a plane between said two rows of balls and normal to the axis of said bearing assembly.

15. An anti-friction bearing assembly as defined in claim 14 characterized in that said raceways have hardened surfaces.

16. An anti-friction bearing assembly as defined in claim 15 characterized in the provision of means holding said rows of balls assembled between the raceways of said rings under predetermined preload.

17. An anti-friction bearing assembly as defined in claim 14 characterized in that said balls and said raceways have a conformity constant of approximately 0.59.

18. An anti-friction bearing assembly as defined in claim 14 characterized in that, under dynamic conditions, the contact angle between the balls in said two rows thereof and a respective associated pair of said raceways varies within a range not exceeding 22° to 51° relative to a plane normal to the axis of said bearing assembly.

19. A heavy-duty anti-friction bearing assembly suitable for use in supporting a stabilized platform or the like with minimal torque losses under loads capable of causing distortion of said bearing assembly comprising:
  a nose ring having an annular radial nose provided with an arcuate raceway on both lateral sides thereof;
  cup ring means concentric to said nose ring having a pair of arcuate raceways facing toward a respective one of said nose ring raceways;
  a row of balls separated by spacer means between each of said nose ring raceways and the adjacent one of said raceways in said cup ring means; and
  each of said row of balls and the pair of said raceways associated therewith having a conformity constant of approximately 0.59.

20. An anti-friction bearing assembly as defined in claim 19 characterized in that, under dynamic conditions, the contact angle between the balls in said two rows thereof and a respective associated pair of said raceways varies within a range not exceeding about 22° to 51° relative to the plane normal to the axis of said bearing assembly.

21. An anti-friction bearing assembly as defined in claim 19 characterized in that, under static conditions, the contact angle of said balls with their associated pair of raceways is about 35° relative to a plane normal to the axis of said bearing assembly.

22. An anti-friction bearing assembly as defined in claim 21 characterized in that each of said raceways extends over an arc of about 90° radially thereof.

23. An anti-friction bearing assembly as defined in claim 21 characterized in that said ball spacer means comprises cage ring means for each of said rows of balls having holes each loosely accommodating a single one of said balls and each of said cage ring means lying in a generally conical surface with the adjacent lateral edges of said cage ring means positioned between the periphery of said nose and the radially opposed portion of said cap ring means.

24. An anti-friction bearing assembly as defined in claim 21 characterized in that said nose ring means is formed in one piece.

25. An anti-friction bearing assembly as defined in claim 21 characterized in that the balls in each of said rows are preloaded.

26. A heavy-duty anti-friction bearing assembly, as defined in claim 21 characterized in that said nose ring and said cup ring means are formed of forged alloy steel and in that each of said raceways is hardened to a hardness of approximately RC 56–61.

* * * * *